(12) United States Patent
Gonze et al.

(10) Patent No.: US 7,997,069 B2
(45) Date of Patent: Aug. 16, 2011

(54) ASH REDUCTION SYSTEM USING ELECTRICALLY HEATED PARTICULATE MATTER FILTER

(75) Inventors: Eugene V. Gonze, Pinckney, MI (US); Michael J. Paratore, Jr., Howell, MI (US); Yongsheng He, Sterling Heights, MI (US)

(73) Assignee: GM Global Technology Operations LLC

( * ) Notice: Subject to any disclaimer, the term of this patent is extended or adjusted under 35 U.S.C. 154(b) by 1085 days.

(21) Appl. No.: 11/823,109

(22) Filed: Jun. 26, 2007

(65) Prior Publication Data
US 2009/0000284 A1 Jan. 1, 2009

(51) Int. Cl.
*F01N 3/00* (2006.01)

(52) U.S. Cl. .............. 60/295; 60/274; 60/276; 60/297; 60/311

(58) Field of Classification Search ............ 60/274, 60/276, 285, 295, 297, 311
See application file for complete search history.

(56) References Cited

U.S. PATENT DOCUMENTS

| | | | |
|---|---|---|---|
| 4,505,726 A | 3/1985 | Takeuchi | |
| 4,516,993 A | 5/1985 | Takeuchi | |
| 6,978,602 B2 * | 12/2005 | Ohtake et al. | 60/297 |
| 6,983,591 B2 * | 1/2006 | Kondo et al. | 60/295 |
| 7,169,364 B2 * | 1/2007 | Ohtake et al. | 422/168 |
| 7,191,592 B2 * | 3/2007 | Patil et al. | 60/297 |

\* cited by examiner

*Primary Examiner* — Thomas E Denion
*Assistant Examiner* — Diem Tran

(57) ABSTRACT

A control system for reducing ash comprises a temperature estimator module that estimates a temperature of an electrically heated particulate matter (PM) filter. A temperature and position estimator module estimates a position and temperature of an oxidation wave within the electrically heated PM filter. An ash reduction control module adjusts at least one of exhaust flow, fuel and oxygen levels in the electrically heated PM filter to adjust a position of the oxidation wave within the electrically heated PM filter based on the oxidation wave temperature and position.

7 Claims, 5 Drawing Sheets

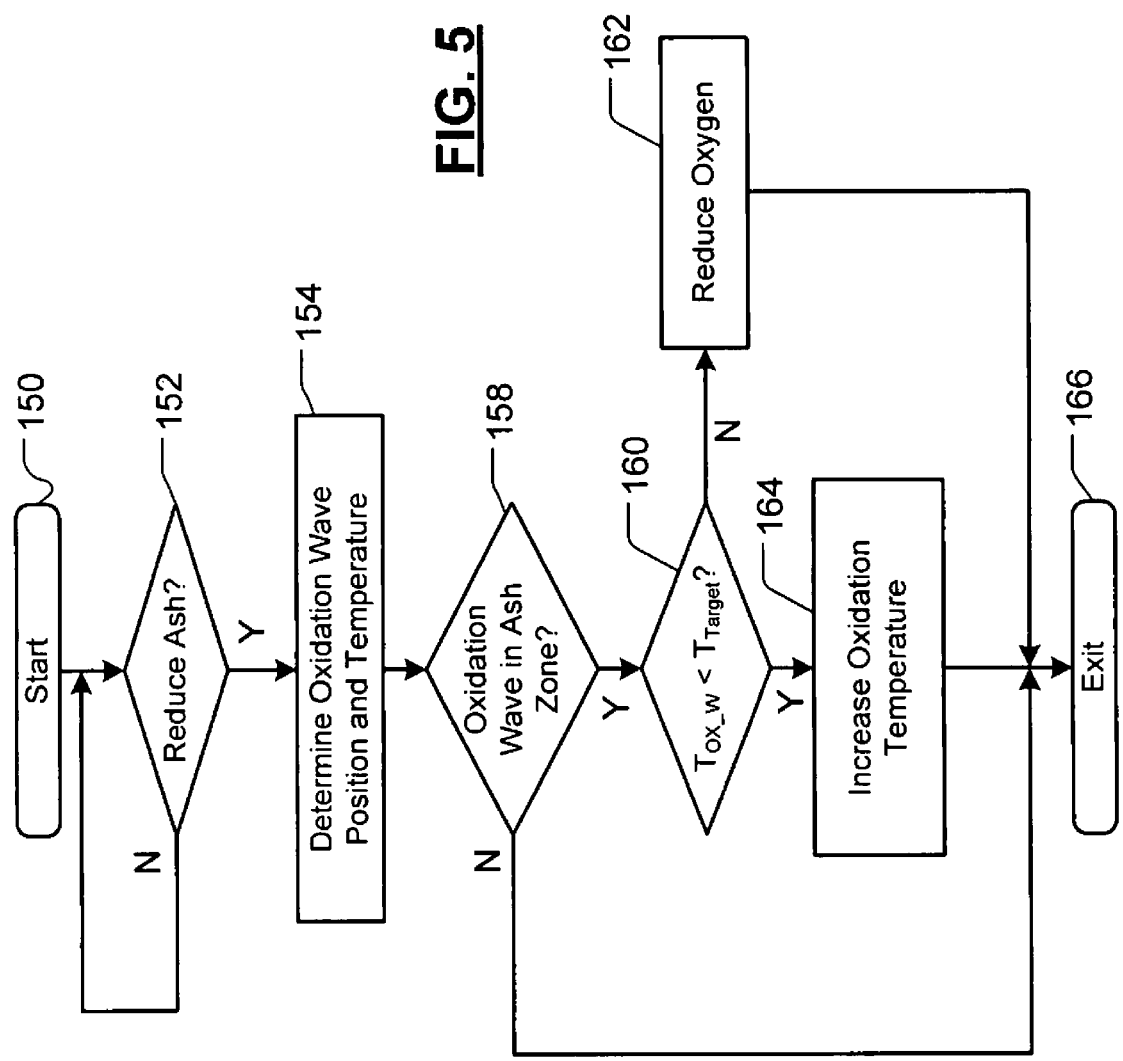

ASH REDUCTION SYSTEM USING ELECTRICALLY HEATED PARTICULATE MATTER FILTER

STATEMENT OF GOVERNMENT RIGHTS

This invention was produced pursuant to U.S. Government Contract No. DE-FC-04-03 AL67635 with the Department of Energy (DoE). The U.S. Government has certain rights in this invention.

FIELD

The present disclosure relates to particulate matter (PM) filters, and more particularly to ash reduction systems for PM filters.

BACKGROUND

The statements in this section merely provide background information related to the present disclosure and may not constitute prior art.

Engines such as diesel engines produce particulate matter (PM) that is filtered from exhaust gas by a PM filter. The PM filter is disposed in an exhaust system of the engine. The PM filter reduces emission of PM that is generated during combustion.

Over time, the PM filter becomes full. During regeneration, the PM may be burned within the PM filter. Regeneration tends to involve heating the PM filter to a combustion temperature of the PM. There are various ways to perform regeneration including modifying engine management, using a fuel burner, using a catalytic oxidizer to increase the exhaust temperature with after injection of fuel, using resistive heating coils, and/or using microwave energy.

Diesel PM combusts when temperatures above a combustion temperature such as 600° C. are attained. The start of combustion causes a further increase in temperature. While spark-ignited engines typically have low oxygen levels in the exhaust gas stream, diesel engines have significantly higher oxygen levels. While the increased oxygen levels make fast regeneration of the PM filter possible, it may also pose some problems.

SUMMARY

A control system for reducing ash comprises a temperature estimator module that estimates a temperature of an electrically heated particulate matter (PM) filter. A temperature and position estimator module estimates a position and temperature of an oxidation wave within the electrically heated PM filter. An ash reduction control module adjusts at least one of exhaust flow, fuel and oxygen levels in the electrically heated PM filter to adjust a position of the oxidation wave within the electrically heated PM filter based on the oxidation wave temperature and position.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 5 is a flowchart illustrating a method for reducing ash in an electrically heated PM filter.

DETAILED DESCRIPTION

Figure 1:
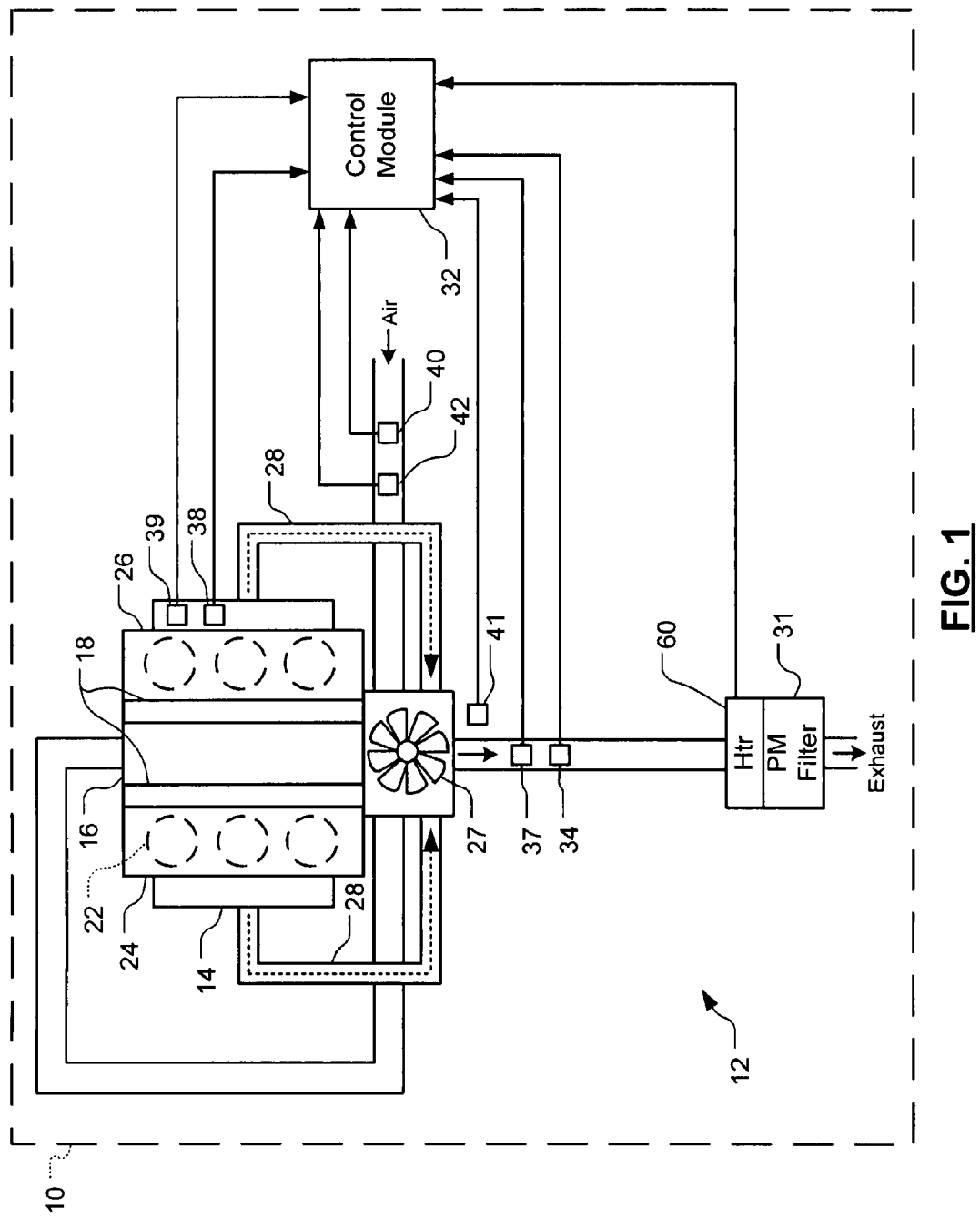
FIG. 1 is a functional block diagram of an exemplary engine including an electrically heated particulate matter (PM) filter.

The following description is merely exemplary in nature and is not intended to limit the present disclosure, application, or uses. It should be understood that throughout the drawings, corresponding reference numerals indicate like or corresponding parts and features.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The present disclosure uses oxidation characteristics of an electrically heated PM filter to reduce the amount of ash that builds up in the PM filter. Ash mainly comprises calcium and zinc compounds that are byproducts of burned engine oil. Ash tends to slowly build up in a rear portion of the PM filter. However, burning the ash at a temperature that is too high may cause glassification of the ash.

Referring now to FIG. 1, a vehicle 10 includes an engine control system 12. The engine control system 12 includes an engine 14, an intake manifold 16, a common rail fuel injection system 18 and a turbocharger 27. The engine 14 includes cylinders 22 configured in adjacent cylinder banks 24 and 26 and in a V-type layout. Although FIG. 1 depicts six cylinders 22, it can be appreciated that the engine 14 may include additional or fewer cylinders 22. For example, engines having 2, 4, 5, 8, 10, 12 and 16 cylinders are contemplated. It is also anticipated that the engine 14 can have an inline-type cylinder configuration. While a turbocharged diesel engine is shown, the present disclosure also applies to other engines such as spark-ignited engines, naturally aspirated diesel engines and/or supercharged engines.

Air is drawn into the intake manifold 16 by the inlet vacuum created by an engine turbocharger 27. Air is ducted into the individual cylinders 22 from the intake manifold 16 and is compressed therein. Fuel is injected with the air by the common rail injection system 18 and the heat of the compressed air ignites the air/fuel mixture. Exhaust gas is exhausted from the cylinders through exhaust conduits 28. The exhaust gas drives the turbocharger 27, which delivers additional air into the cylinders 22 for combustion.

Exhaust gases pass through a particulate matter (PM) filter 31, which extracts PM from the exhaust stream. The exhaust gases exit the PM filter 31. The PM filter 31 may include an electric heater 60, which selectively heats the PM filter 31 to combust the particulate matter.

A control module 32 controls operation of the engine control system 12. More specifically, the control module 32 controls engine system operations based on various input parameters. The control module 32 may receive a temperature signal from a temperature sensor 34 that senses the temperature of exhaust gases. The control module 32 may receive a pressure signal from an exhaust pressure sensor 37 that senses the pressure in the exhaust system.

The control module 32 may receive a speed signal from a speed sensor 38 in the engine 14. The control module 32 may receive a temperature signal from an engine coolant sensor 39 that senses a temperature of coolant in the engine 14. The control module 32 may receive a temperature signal from an inlet air temperature sensor 40 that detects an inlet air temperature of the engine 14. The control module 32 may receive a pressure signal from an ambient pressure sensor 41 that senses a pressure of the air outside of the engine 14. The control module 32 may receive an airflow signal from a mass airflow sensor 42 that detects a rate that air flows into the engine 14. The control module 32 selectively supplies power to the heater 60. Still other sensors may be provided as needed to sense other operating conditions.

Figure 2:
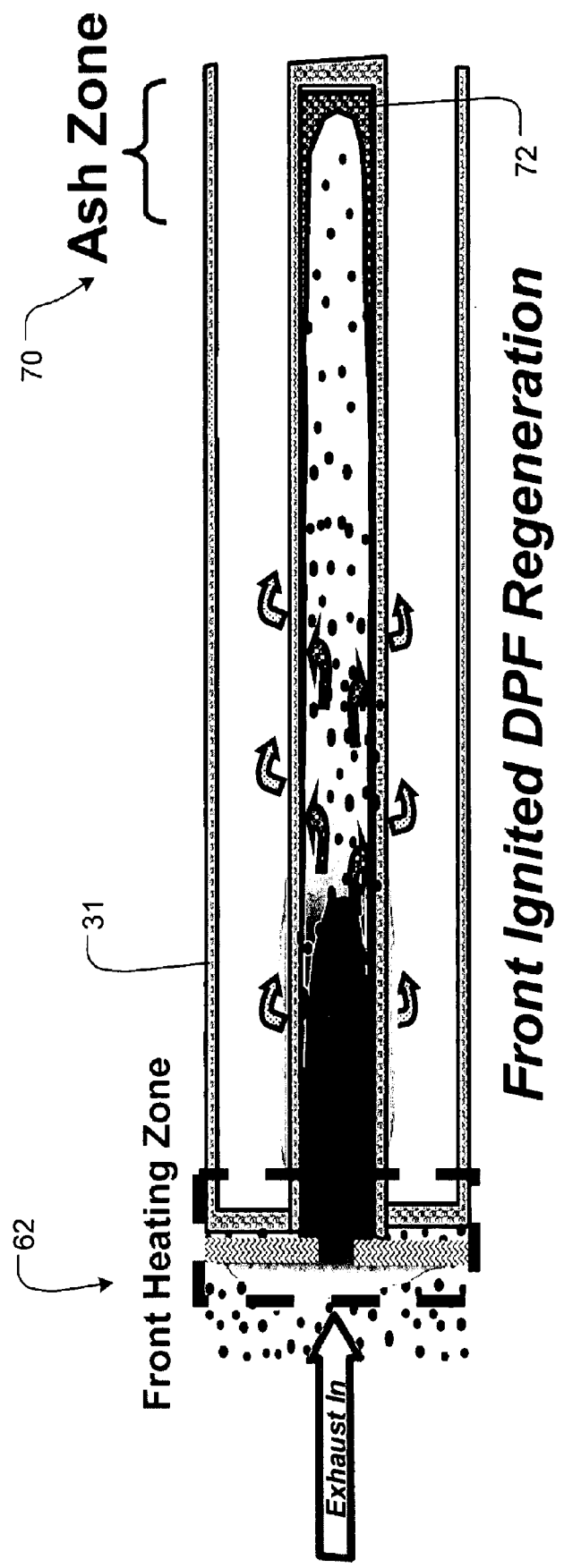
FIG. 2 illustrates heating of PM and ash in the PM filter.

Referring now to FIG. 2, the PM filter 31 is shown in further detail. Exhaust gas is received in a front heating zone 62 adjacent to the heater (not shown in FIG. 2). Particulate matter builds up on inner walls of the PM filter 31. During operation, an ash zone 72 is created near an outlet end of the PM filter 31.

Figure 3:
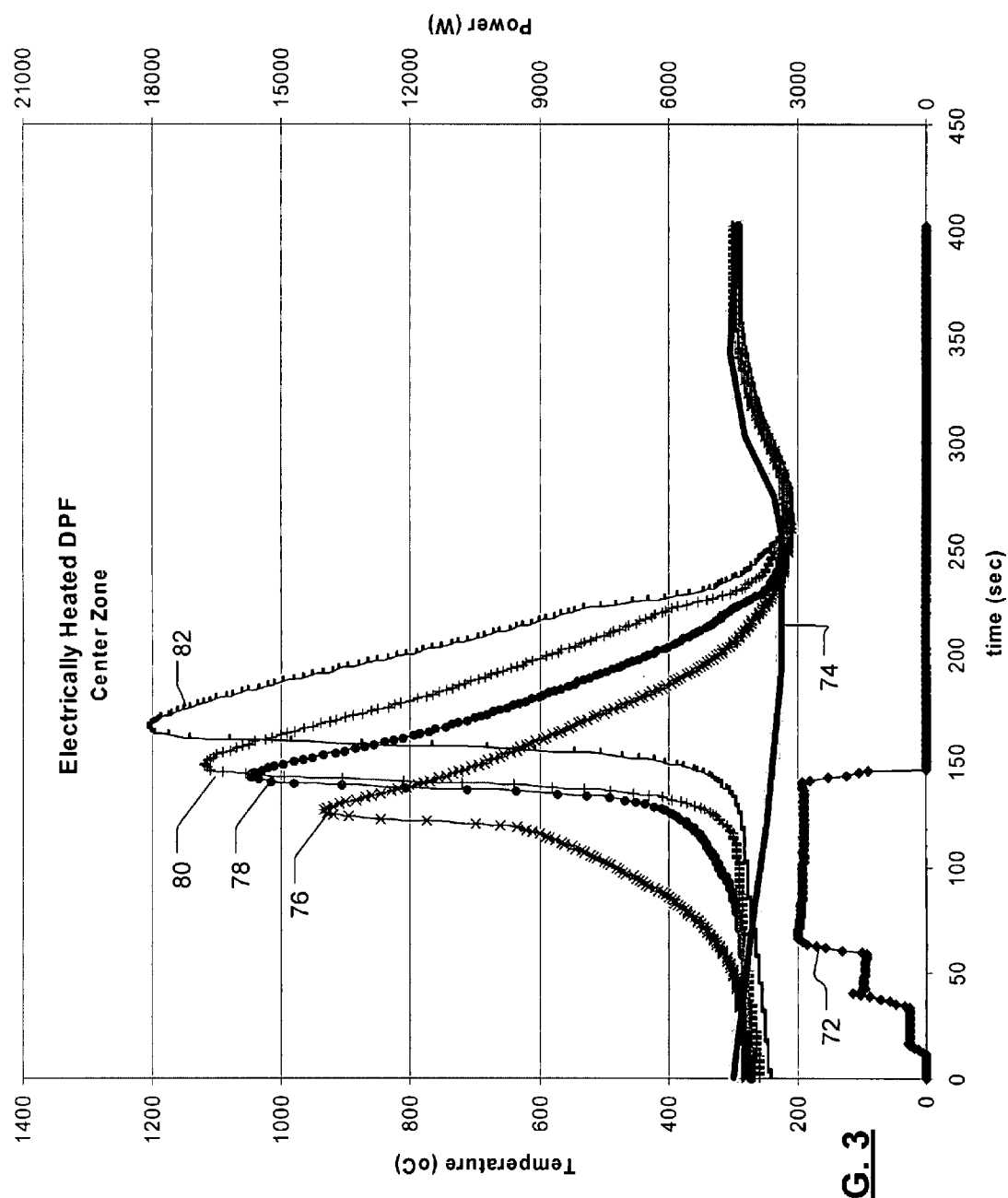
FIG. 3 is a graph illustrating temperature of a wavefront as a function of time and power input to the electrically heated PM filter.

Referring now to FIG. 3, an exemplary burning pattern in an electrically heated PM filter is shown. Power input to the electrically heated PM filter is shown at 72. Exhaust gas temperature is shown at 74. Temperatures identified by reference numbers 76-82 correspond to portions of the electrically heated PM filter that are successively closer to the ash zone 70. A wavefront of burning PM traverses down a channel in the PM filter 32 and oxidizes the soot. This flame front increases in temperature as it oxidation propagates down the PM filter channel due to a increasing reduced area of the channel due to the ash buildup.

The ash reduction strategy according to the present disclosure targets increasing the oxidation temperature of the cascading wavefront in the ash zone 72 in the rear of the PM filter 31 without exceeding the glassification temperature of the ash. Predictive modeling can be used to estimate a temperature of the burning soot as well as a position of the flame front as will be described further below.

The control module 32 may control one or more engine parameters to control the wavefront temperature and location. For example, the exhaust flow, oxygen and/or fuel may be adjusted. The wave temperature may be controlled between first and second temperature values. The first and second temperature values may be 1140° C. and 1250° C. By selectively controlling the exhaust chemistry, the temperature of the cascading flame front may be controlled.

Figure 4:
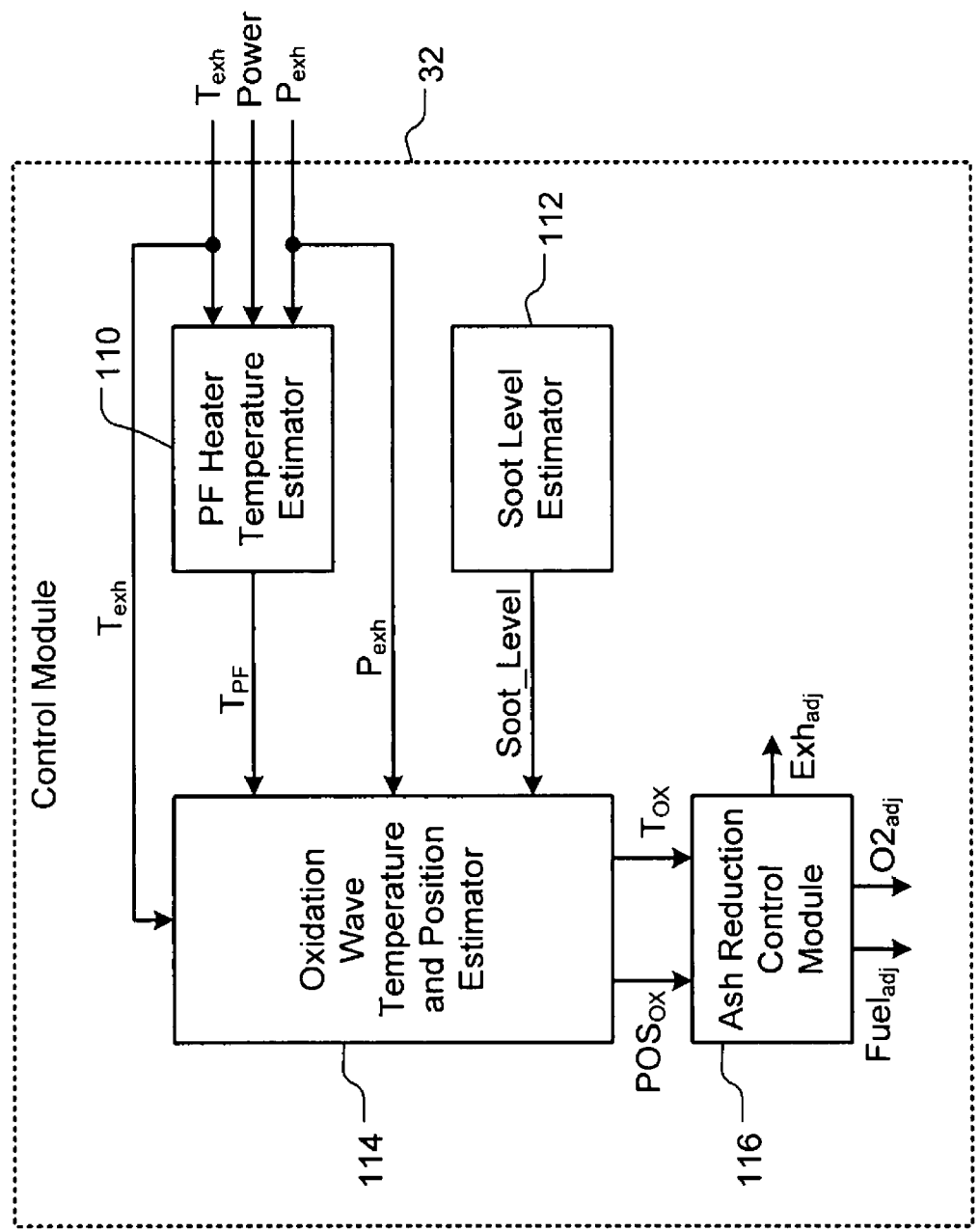
FIG. 4 is a functional block diagram of an exemplary control module for an ash reduction system.

Referring now to FIG. 4, the control module 32 may include a PF heater temperature estimator 110 that estimates a temperature of the PF heater or $T_{PF}$. The estimation may be based on the exhaust temperature $T_{exh}$, power supplied to the PF heater and/or flow through the PF filter. The flow may be measured using a pressure sensor that senses exhaust pressure $P_{exh}$, using model estimation or using any other suitable method.

The control module 32 may also include a soot level estimator module 112 that estimates a level of soot in the PM filter. An oxidation wave temperature and position estimator module 114 estimates a temperature $T_{OX}$ and position $POS_{OX}$ of the wavefront based on $T_{exh}$, $T_{PF}$, $P_{exh}$ (or exhaust flow) and/or Soot_Level. An ash reduction control module 116 selectively adjusts at least one of fuel, oxygen or exhaust flow based on the position and temperature of the wavefront to reduce ash as will be described further below.

Referring now to FIG. 5, steps of a method for reducing ash are shown. Control begins in step 150. In step 152, control determines whether a request to reduce ash has been generated. If true, control determines the oxidation wavefront position and temperature in step 154. In step 158, control determines whether the oxidation wavefront is in the ash zone. If step 158 is true, control determines whether the oxidation wavefront temperature is below a target temperature $T_{target}$. If false, control reduces oxygen levels in step 162 to prevent glassification of the ash. For example only, the target temperature $T_{target}$ may be set at or below 1250° C. If step 160 is true, the oxidation temperature is increased by adjusting at least one of fuel, oxygen and/or exhaust flow. For example, oxygen may in be increased, exhaust flow may be reduced and/or fuel may be added. Control continues from steps 158 (if step 158 is false), 162 and 164 with step 166.

The following formulas illustrate the chemical transformation that reduces ash in the ash zone:

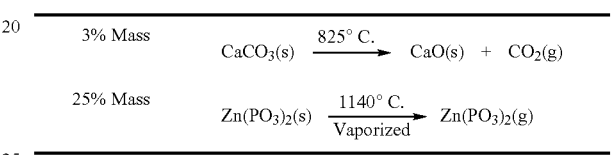

The present disclosure allows approximately 28% ash reduction within the electrically heated PM filter without causing damage. The control module in conjunction with the electrically heated PM filter optimizes the flame front temperature within a targeted ash reduction zone. As a result, a volume of the PM filter can be reduced for a particular implementation. The ash accumulated in the PM filter doesn't filter particulate matter and therefore reduces effective volume of the PM filter. By reducing the ash amount by approximately 28%, the volume utilization is increased. As a result, a smaller PM filter can be used for a given application, which reduces the DPF cost.

What is claimed is:

1. A method for reducing ash accumulation in an electrically heated particulate matter (PM) filter, comprising:
   estimating a position of an oxidation wave within the electrically heated PM filter;
   estimating a temperature of the oxidation wave within the electrically heated PM filter;
   determining whether the position of the oxidation wave is within an ash zone of the electrically heated PM filter, wherein the ash zone is located near a downstream end of the electrically heated PM filter;
   decreasing the temperature of the oxidation wave when the position of the oxidation wave is within the ash zone and the temperature of the oxidation wave is greater than a predetermined temperature; and
   increasing the temperature of the oxidation wave when the position of the oxidation wave is within the ash zone and the temperature of the oxidation wave is less than the predetermined temperature.

2. The method of claim 1, wherein increasing the temperature of the oxidation wave includes increasing oxygen levels in the electrically heated PM filter.

3. The method of claim 1, wherein increasing the temperature of the oxidation wave includes decreasing exhaust flow through the electrically heated PM filter.

4. The method of claim 1, wherein increasing the temperature of the oxidation wave includes adding fuel to exhaust gas flowing through the electrically heated PM filter.

5. The method of claim 1, wherein decreasing the temperature of the oxidation wave includes decreasing oxygen levels in the electrically heated PM filter.

6. The method of claim 1, wherein the estimating the temperature and position of the oxidation wave is based on at least two of a soot level within the electrically heated PM filter, exhaust flow, a temperature of the electrically heated PM filter, and exhaust temperature.

7. The method of claim 1, wherein the predetermined temperature is between 1140 degrees Celsius (° C.) and 1250° C.

* * * * *